United States Patent
Raikar

(10) Patent No.: US 7,636,944 B2
(45) Date of Patent: Dec. 22, 2009

(54) METHOD AND APPARATUS FOR DETECTING AND RESPONDING TO EMAIL BASED PROPAGATION OF MALICIOUS SOFTWARE IN A TRUSTED NETWORK

(75) Inventor: Amit Raikar, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 830 days.

(21) Appl. No.: 11/262,436

(22) Filed: Oct. 28, 2005

(65) Prior Publication Data

US 2007/0101430 A1    May 3, 2007

(51) Int. Cl.
*G06F 11/00* (2006.01)
*H04L 9/00* (2006.01)

(52) U.S. Cl. .............................. 726/22; 726/23; 726/24; 726/1

(58) Field of Classification Search ................. 726/1–3, 726/11–14, 22–25; 713/150–154, 187–188
See application file for complete search history.

(56) References Cited

U.S. PATENT DOCUMENTS

| 6,941,348 B2 * | 9/2005 | Petry et al. .................. 709/206 |
| 2004/0111632 A1 * | 6/2004 | Halperin ..................... 713/200 |

* cited by examiner

*Primary Examiner*—Hosuk Song

(57) ABSTRACT

Embodiments of the invention provide a method and an apparatus for detecting and responding to email based propagation of malicious software (malware) in a trusted network. One embodiment provides a detector decoy email account to serve as generic bait for malicious software for a domain within the trusted network. In addition, at least one email account for the domain within the trusted network is provided as a detector probe account. In so doing, when the detector decoy email account receives an email from the detector probe account within the trusted network a policy based infection response rule is generated.

25 Claims, 6 Drawing Sheets

METHOD AND APPARATUS FOR DETECTING AND RESPONDING TO EMAIL BASED PROPAGATION OF MALICIOUS SOFTWARE IN A TRUSTED NETWORK

TECHNICAL FIELD

The present invention generally relates to trusted network environments. More specifically to a system and method for detecting and responding to email based propagation of malicious software in a trusted network.

BACKGROUND ART

Presently, malicious software (malware) such as worms, viruses and the like are capable of wreaking havoc on computing systems, networks and the like by infecting the system and causing bandwidth problems. In many cases, email is used as the method for propagating the malware. Some malware even installs backdoor (e.g., myDoom) access to the infected system. Therefore, even though the infected system might be ultimately cleaned up, (and hopefully recover from any damage via back up) and the network traffic congestion resulting in only a temporary (although costly) problem, the installation of a backdoor on the infected system can lead to total bypass of perimeter defenses both at the network and host level. In many cases, the infected system only gets detected when the latest anti-virus signatures are installed.

In almost all cases, waiting for the anti-virus signature update can leave the system or network vulnerable for a day or more. This delay is the result of the anti-virus vendor investigating the virus, putting together a signature and then being able to distribute the same to all the anti-virus agents. In addition, the anti-virus signatures are not very effective against worms that are polymorphic, e.g., which change their behavior as they self-propagate. For example, instead of opening a backdoor on port 1434 on every infected system, the worm may configure the backdoor on random ports for every system. In other cases, the worm may simply modify certain portions of the email payload to overcome the anti-virus signatures.

Presently, to overcome the propagation of emailed malware from outside the firewall of a network, a spam type recognition engine is used. In general, the spam recognition is used to stop unwanted and unsolicited emails from reaching the devices within the trusted network (e.g., devices behind the firewall). For example, when the system receives an unsolicited or bulk email, the spam filter will update a content filtering engine (e.g., bad boy list, subject, source, and the like) with the address utilized by the unsolicited email. In so doing, the network protected by the anti-spam engine will be able to block the unsolicited email including any email malware attachments therein.

However, this method does not address the problems associated with email malware being passed from one trusted system within the trusted network to another (or plurality of) trusted system(s) within the trusted network. For example, if a user within the trusted network accidentally (or maliciously) provides malware to a system within the trusted network, the spam recognition is useless. That is, since the email is generated with a "good" or recognized email address, the spam recognition engine will let the email pass as being 'a trusted email within the trusted email network'. Therefore, infection of a large portion of the (or even the entire) trusted network could occur before the virus is detected, resulting in the deleterious problems previously described.

DISCLOSURE OF THE INVENTION

Embodiments of the invention provide a method and an apparatus for detecting and responding to email based propagation of malicious software (malware) in a trusted network. One embodiment provides a detector decoy email account to serve as generic bait for malicious software for a domain within the trusted network. In addition, at least one email account for the domain within the trusted network is provided as a detector probe account. In so doing, when the detector decoy email account receives an email from the detector probe account within the trusted network a policy based infection response rule is generated.

BRIEF DESCRIPTION OF THE DRAWINGS

The accompanying drawings, which are incorporated in and form a part of this application, illustrate embodiments of the present invention, and together with the description, serve to explain the principles of the invention. Unless noted, the drawings referred to this description should be understood as not being drawn to scale.

BEST MODE FOR CARRYING OUT THE INVENTION

Figure 1:
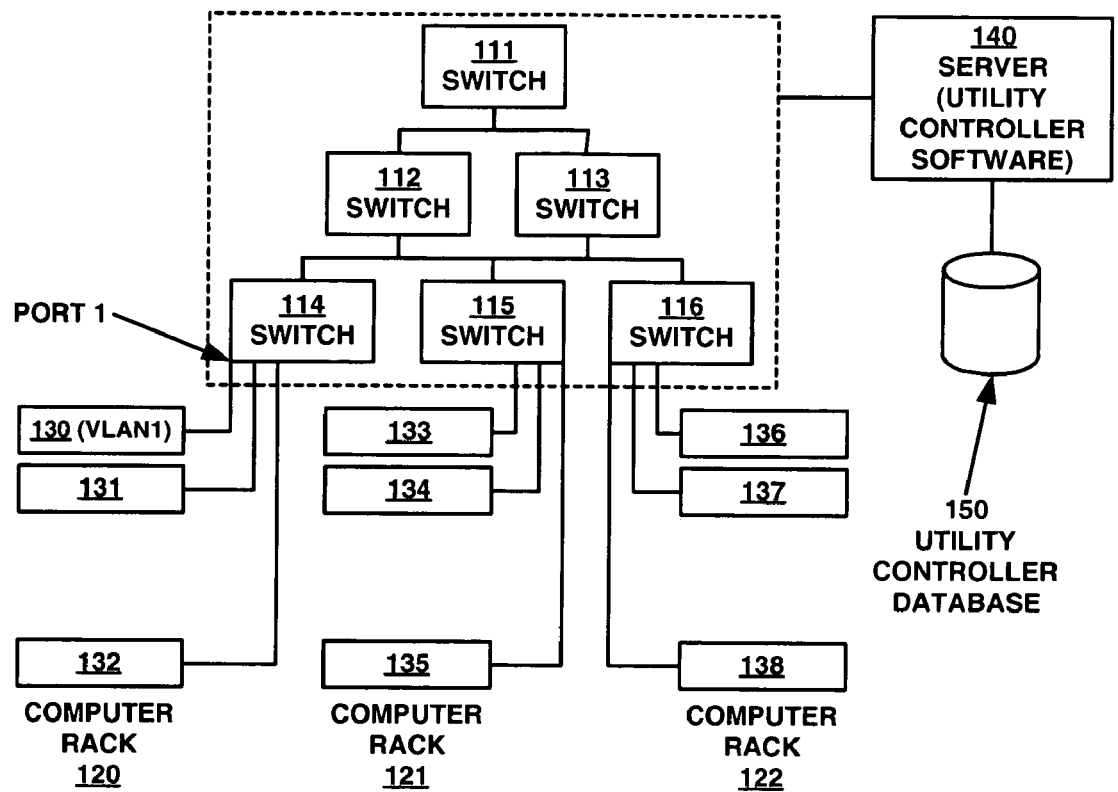
FIG. 1 is a block diagram of an exemplary LAN upon which embodiments of the present invention can be implemented.

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Aspects of the present invention may be practiced on a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

Overview

Embodiments of the email based propagation of malicious software (malware) detector provide an automated method and apparatus for detecting and responding to email based propagation of malicious software in a trusted network. Embodiments further provide a detector which is capable of detecting "zero-day" type worms (e.g., malware for which anti-virus signatures have not yet been put together) within a trusted infrastructure and ensuring that the infected trusted system is stopped from infecting other trusted systems within the trusted infrastructure (e.g., a utility computing environment).

Presently, numerous trusted network models exist. In general, a trusted network is a group of interconnected devices shielded from outside activity. That is, the trusted network has a security features such as a firewall and the like to limit or completely stop outside (or non-trusted) devices from interacting with inside (or trusted) devices within the confines of the security perimeter. One form of trusted networks is a utility computing environment. One example of the utility computing environment is the utility data center (UDC) available from Hewlett-Packard of Palo Alto, Calif. Although such a specific implementation will be mentioned herein, it should be understood that embodiments of the present invention are also well suited to use with various other trusted networks, such as utility computing environments and the like. The present description begins with an overview an exemplary trusted environment. The details of the detecting and responding to email based propagation of malicious software in a trusted network are then described in further detail.

In one embodiment, a decoy email account is established for detecting email worms such that whenever an email is received from an account within the same email domain to the decoy email account, the decoy account automatically assumes that the source email account has been infected with malware (e.g., virus, worm, and the like). An auto response is then configured to limit further propagation of the malware by isolating the account and/or system that has been infected. In one embodiment, a decoy email account is configured into every email account within the domain that is sought to be protected to serve as generic bait for malware (e.g., "zero-day" worms, other worms, viruses, and the like) that harvest email accounts on the infected system to propagate themselves. That is, the decoy address is provided to each email account within the domain, e.g., in the address book, inbox, sent items, and the like.

With reference now to FIG. 1, a block diagram of an exemplary local area network (LAN) 100 is shown in accordance with embodiments of the present invention. It is appreciated that LAN 100 can include elements in addition to those shown (e.g., more racks, computers, switches and the like), and can also include other elements not shown or described herein. Furthermore, the blocks shown by FIG. 1 can be arranged differently than that illustrated, and can implement additional functions not described herein. Although a LAN is described herein, embodiments of the present invention are well suited for utilization with other types of networks. For example, in one embodiment, the utility computing environment includes a storage array. In another embodiment, the utility computing environment also includes a storage area network (SAN). In yet another embodiment, the utility computing environment includes a LAN, a SAN and a storage array. The present FIG. 1 is merely one of a plurality of possible network configurations that are within the scope of the utility computing environment shown for purposes of clarity.

In the present embodiment, LAN 100 includes a number of switches 111 through 116, and a number of computers 130-138 that are coupleable to the switches 111-116. Typically, the computers 130-138 are stored in computer racks 120, 121 and 122, although this may not always be the case. In this embodiment, the switches and computer systems are shown as being interconnected using cables or the like. However, wireless connections between devices in LAN 100 are also contemplated.

In one embodiment, the switches 111-116 are capable of being programmed or configured such that LAN 100 is logically separated into a number of VLANs. The programming or configuring of these switches can be changed, thereby changing the resources allocated to the various VLANs. For example, by changing the configuration of switch 114, computer system 130 can be "virtually moved" from one VLAN to another. The allocation and reallocation of resources between VLANs is one of the valuable operations performed after the actual physical building of the network structure.

In addition to computer systems and switches, LAN 100 can include other types of devices such as, but not limited to, routers, load balancers, firewalls, and hubs. These other types of devices may also be programmable or configurable.

The term "configurable device" is used herein to refer to devices that can be programmed or configured. The term "configuration information" is used herein to refer to information that describes the configuration of a configurable device. In one embodiment, the computer-readable network map need not exist in the form conventionally associated with human-readable maps. Furthermore, a network map may include information such as the types of devices in the LAN and a representation of each VLAN. Other information included in a network map includes, but is not limited to: the network or MAC (media access control) address for the resources of the LAN; the port numbers of the configurable devices; the VLAN identifiers associated with each of the port numbers; the socket identifier for each cable connected to each of the resources of LAN; manufacturer and model numbers; and serial numbers.

Figure 2:
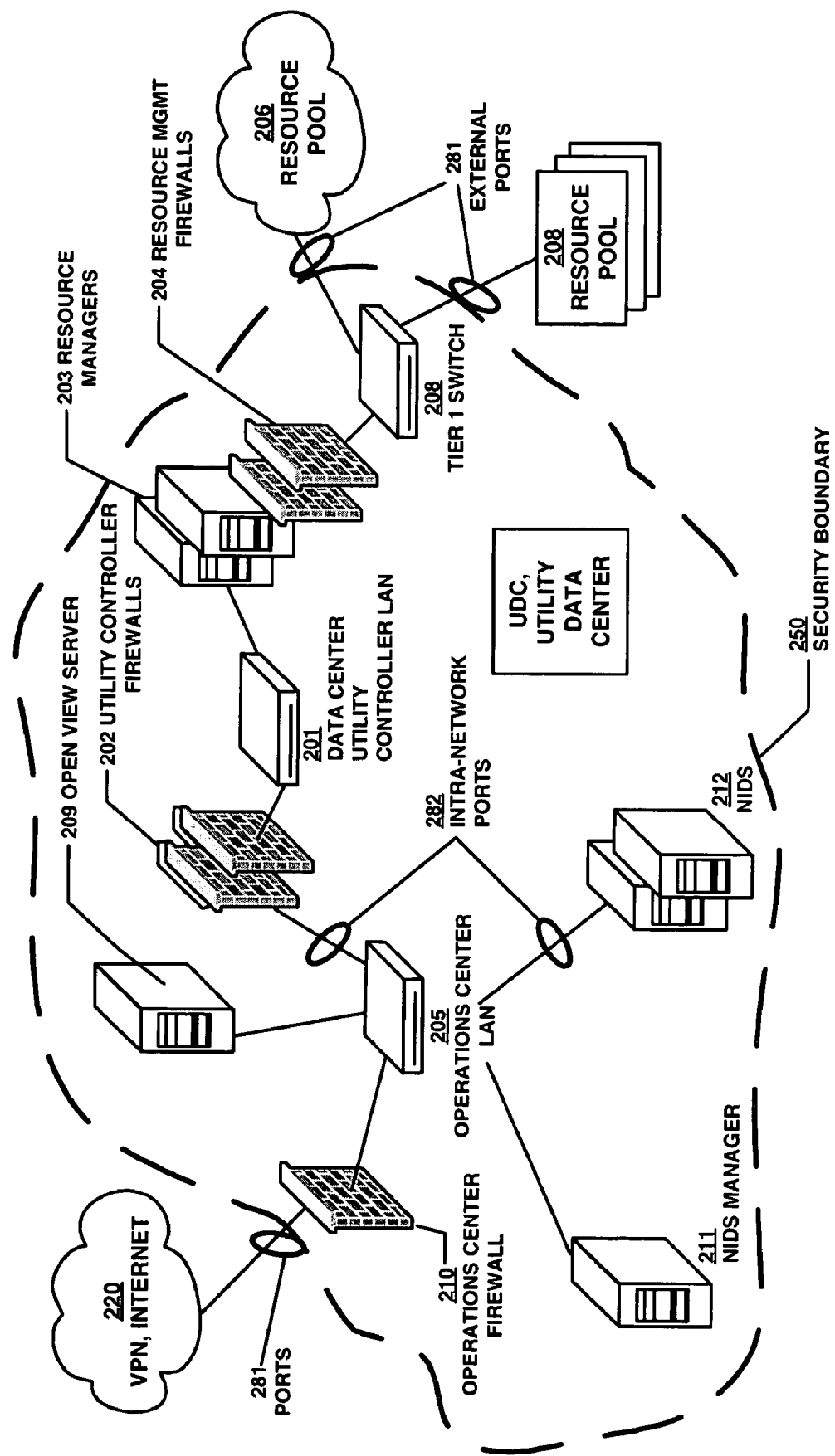
FIG. 2 is a block diagram of an exemplary utility computing environment in accordance with one embodiment of the present invention.

With reference now to FIG. 2, an exemplary provisionable (e.g., trusted) network in which embodiments of the present invention can function is shown. Provisional network, or utility computing environment (UCE), 200 is shown bounded by a security boundary 250. In one embodiment, security boundary 250 is a virtual boundary. Boundary 250 is shown here only to help illuminate the concepts of trusted environment as presented herein. Typical UCE 200 comprises an operations center local area network (LAN) 205, a data center utility controller LAN 201 and resource pools 206. It is noted here that, by their very nature, UCEs are flexible in their composition, comprising any number and type of devices and systems. It is this flexibility from which they derive their usefulness. The specific architecture illustrated in FIG. 2, therefore, is not meant to limit the application of embodiments of the present invention to any particular provisionable network architecture.

Typical UCE 200, in this illustration, communicates with the outside world via the Internet 220 and virtual public networks (VPNs) in the Internet. The communications links that enable this communication are protected by firewall 210. Firewall 210 is shown to illustrate a concept and is not meant to imply any particular method or system of intrusion protection. Many types of hardware and software firewalls are well known in the art and firewall 210 may be either or both.

It is noted here that communications into and out of a provisionable network, as in any network, is accomplished through ports such as illustrated at 281. Communications between devices within a network are also conducted through ports, as alluded to at 282. It is noted that ports are not necessarily physically located at the periphery of a network but are logical end points. External ports 281 and intra-network ports 282 are shown only to help illustrate the concepts presented in embodiments of the present invention. It is also noted that virtual security boundary 250 does not exist in a physical sense. Resources included in the servers and LANs comprising utility computing environment 200 may include devices and servers located remotely from the other elements of the UCE.

As shown in FIG. 2, operations center (OC) LAN 205 comprises an internal trust domain. Included in OC LAN 205 are open view servers 209, network intrusion detection system (NIDS) 212 and NIDS manager 211. It is noted that, though NIDS 212, NIDS manager 211 are illustrated as computer-like devices, their physical existence is not limited to a particular device. Each may exist as a standalone device or implemented as software resident in a physical device or server.

The heart of the exemplary utility computing environment illustrated in FIG. 2 is the data center utility controller (UC) LAN, 201. This LAN represents another, higher, internal trust domain. UC LAN communicates through OC LAN 205 and is typically separated from it by various forms of firewalls 202. UC LAN 201 can comprise various numbers of resource managers, such as illustrated at 203. The flexibility inherent in the UCE concept can result in many combinations of resources and resource managers. Resource managers 203 are the typical interface with the various pools of resources 206, communicating with them through ports and some sort of switching network as indicated by the tier 1 switch at 208.

Resource pools 206 are limitlessly flexible, comprising any conceivable combination of data servers, computational capability, load balancing servers or any other device or capability imaginable. Because the possible varieties of resources that can be included in resource pools 206, they are separated from UC LAN 201 by firewalls 204, which, like UC firewalls 202, can be software or hardware or both, in many combinations.

It is noted that embodiments of the present invention can run in many different environments. One network management environment in which an embodiment operates serves as an end-to-end service management infrastructure and is particularly well suited to managing a provisionable network which is known as a utility data center (UDC).

In one embodiment, the UCE maintains a list of each individual network device and the attributes of the device. For example, the attributes of a device may include, but are not limited to, the make, model, type, role, and unique identifier of the device. Additionally, the UCE may list each individual connection that will connect the network devices, and the attributes of those connections, such as, but not limited to, the unique identifier of the source device, the unique identifier of the destination device, the identifier of the source device's port, into which the cable is inserted, the identifier of destination device's port, into which the cable is inserted, and the type of cable used in the connection. For example, the cable may be, but is not limited to, a power cable, serial cable, Ethernet cable, fibre channel cable, or SCSI cable.

Figure 3:
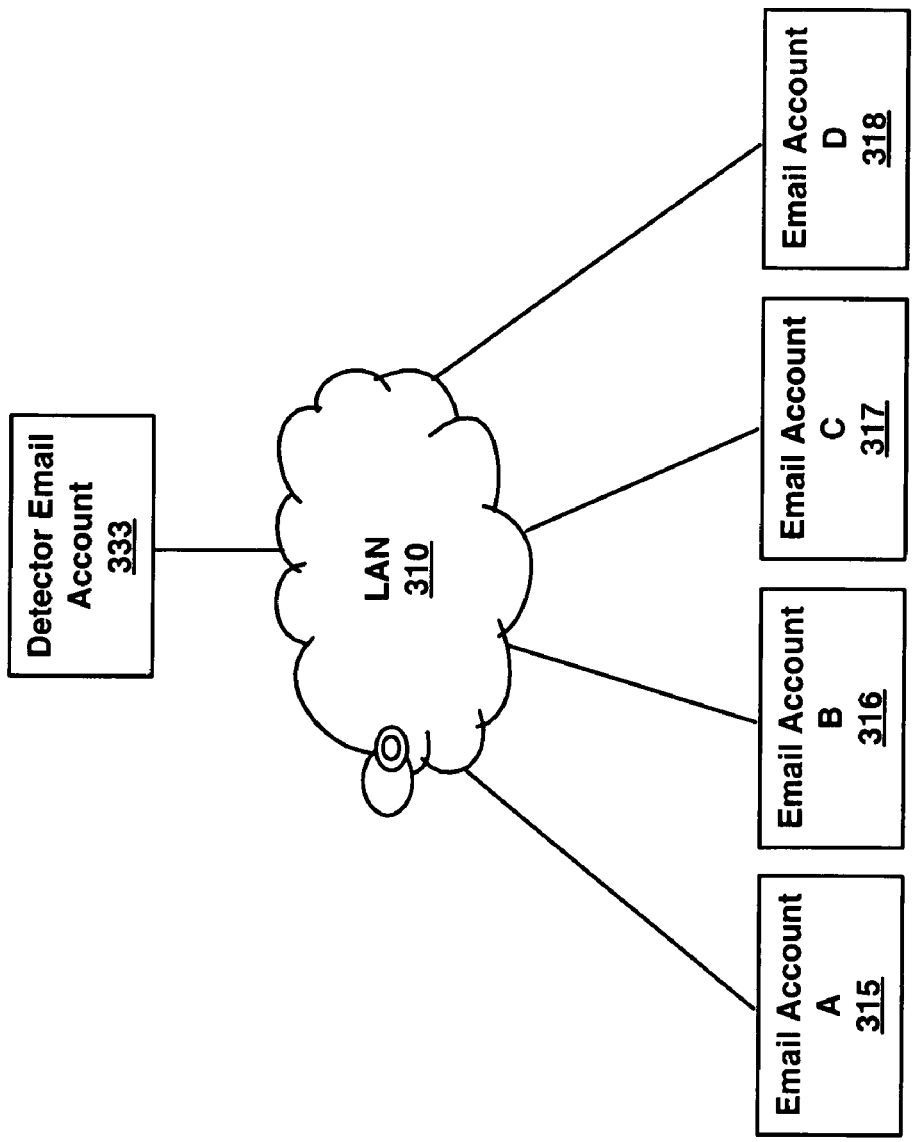
FIG. 3 is a block diagram of a portion of an exemplary trusted network infrastructure in accordance with one embodiment of the present invention.

With reference now to FIG. 3, a block diagram of a portion of an exemplary trusted network infrastructure is shown in accordance with one embodiment of the present invention. In one embodiment, network 300 includes a detector decoy email account 333 and a local area network (LAN) 310. LAN 310 can include elements such as racks, routers, cables, switches and other elements that are well known in the art. Network 300 also includes a plurality of trusted devices with email accounts 315-318. In one embodiment, each email account (e.g., 315-318) may be part of a VLAN or farm which may also include servers, disk arrays, and the like.

In one embodiment, LAN 310 includes a number of connections coupled to a number of computing devices hosting email accounts 315-318 in a similar fashion to that of FIG. 1. Typically, the computing devices hosting email accounts 315-318 are connected with the LAN 310 using cables or the like. However, wireless connections between the computing devices hosting email accounts 315-318 and LAN 310 are also contemplated.

In one embodiment, the connections are connected to switches such as the switches 111-116 of FIG. 1. In general, the switches are capable of being programmed or configured such that LAN 310 is logically separated into a number of VLANs or farms. The programming or configuring of these switches can be changed, thereby changing the resources allocated to the various VLANs. Moreover, each VLAN or farm is considered a trusted infrastructure. Therefore, for each VLAN or farm allocation, an email malware detector (such as email malware detector 400 of FIG. 4) may be used to monitor the trusted network.

In addition to computer systems and switches, LAN 310 can include other types of devices such as, but not limited to, routers, load balancers, firewalls, and hubs. These other types of devices may also be programmable or configurable.

Operation

Figure 4:
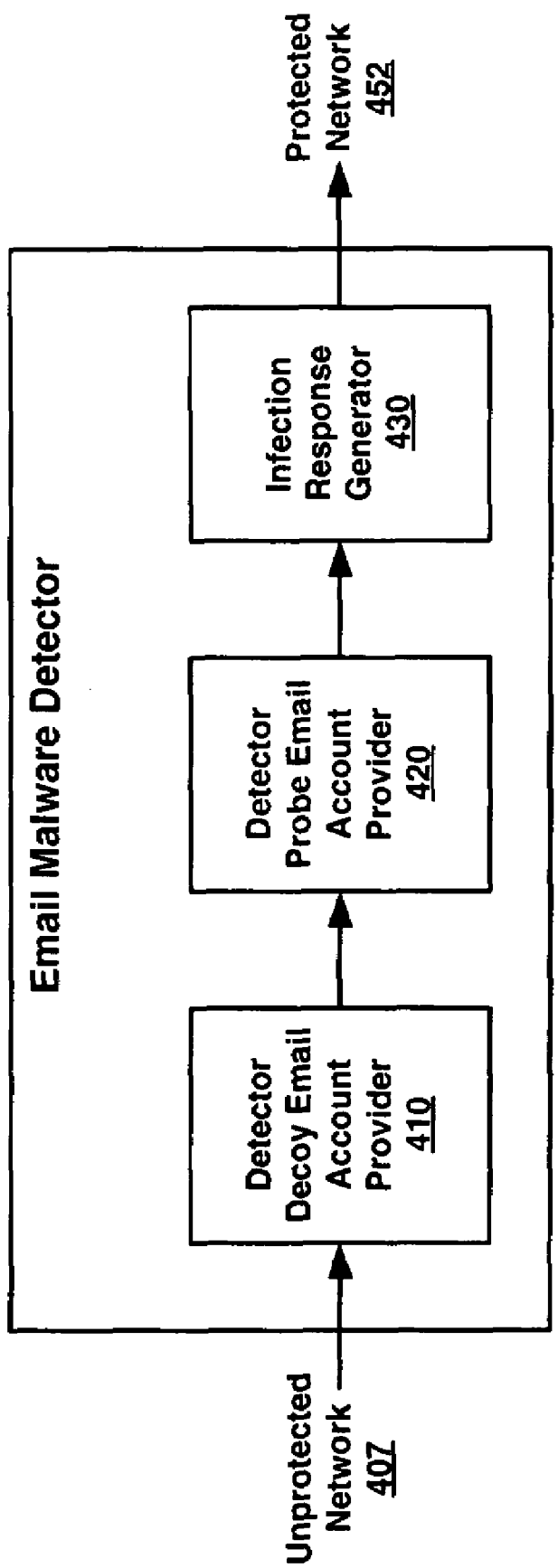
FIG. 4 is a block diagram of an exemplary email malware detector in accordance with one embodiment of the present invention.

With reference now to FIG. 4, a block diagram of an exemplary email malware detector is shown in accordance with one embodiment of the present invention. In one embodiment, the email malware detector 400 includes a detector decoy email account provider 410, an email detector probe provider 420 and an infection response generator 430. As illustrated in block diagram 400, the email malware detector 400 and email detector probe 420 are provided to change an unprotected trusted network 407 into a protected trusted network 452.

In general, the detector decoy email account provider 410 sets up the decoy email account. In addition, the detector probe email account provider 420 configures the decoy email account (e.g., decoy account 333 of FIG. 3) into every email account (e.g., contacts list, inbox, sent items, or the like) on the trusted domain to be protected. In one embodiment, email detector probe provider 420 setup prevents a user of an email account within the trusted domain to accidentally delete or modify the decoy account 333 of FIG. 3. In other words, if a user selects the decoy email account configuration to be deleted or modified, in one embodiment, the user is provided a warning and the action is not performed. In one embodiment, the infection response generator 430 will become operational after the email malware detector 400 receives an email from an account within the trusted domain. In general, the infection response generator 430 will take automatic measures to ensure the further propagation of the malware is slowed and/or prevented. Further operation of each of the components of the email malware detector 400 is provided in more detail herein.

Figure 5:
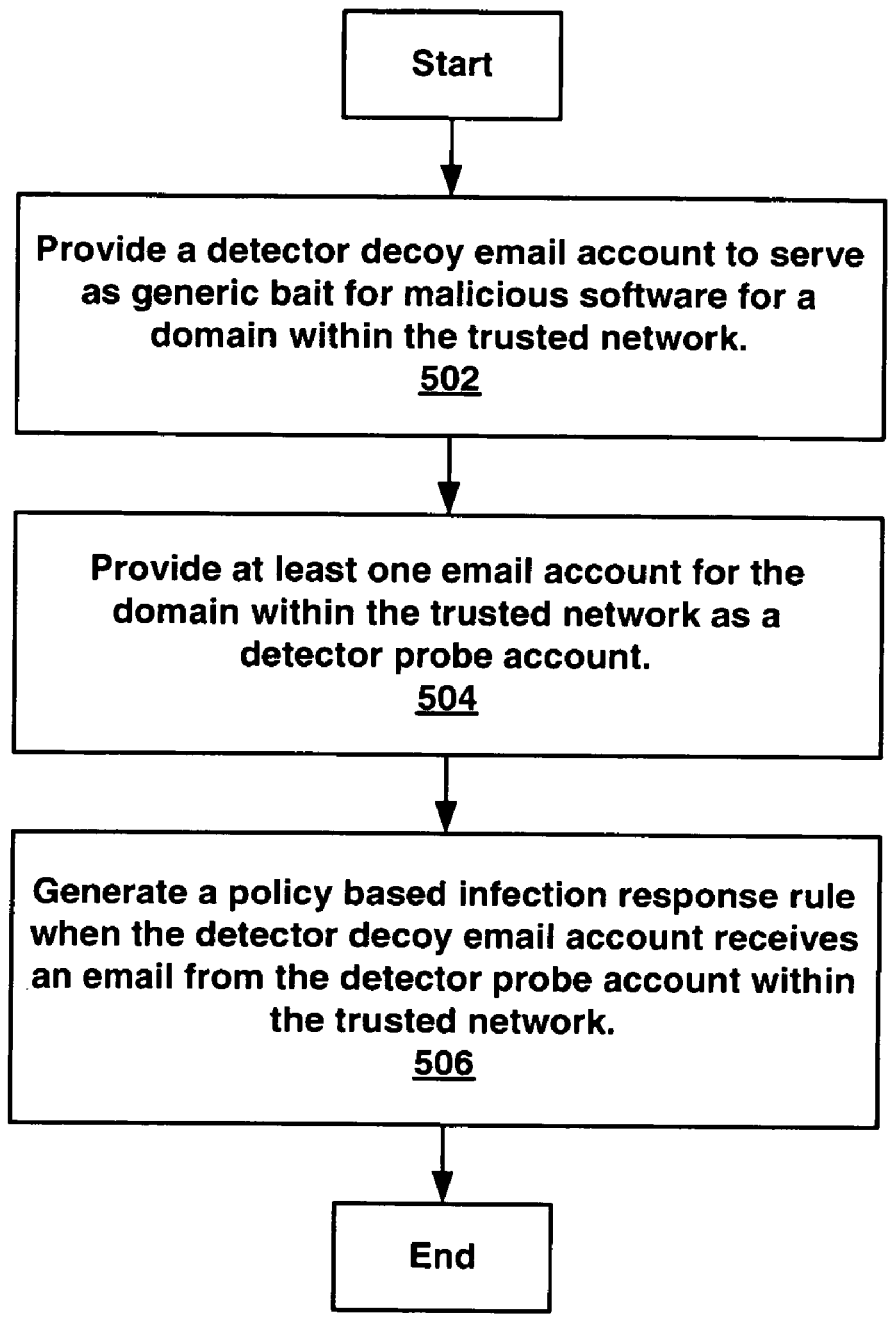
FIG. 5 is a flowchart of a high level exemplary method for detecting and responding to email based propagation of malicious software in a trusted network in accordance with one embodiment of the present invention.

Referring now to FIG. 5, a flowchart of a method for detecting and preventing propagation of email based malware in a trusted environment is shown in accordance with one embodiment of the present invention. In general, one of the ways email based malware propagates is by self-emailing to a plurality of (in some cases all) email addresses that are accessible in the account the malware has infected or compromised. This process is also known as harvesting of email accounts by the malware or worm (malware that tries to self-propagate). In some cases, the harvesting may include email addresses that are present in the contacts list, the inbox folder, the sent folder, and the like.

The present invention verifies the existence of the harvesting behavior in a trusted email account, and once verified (e.g., detected) proceeds to automatically prevent further propagation. In one embodiment, three phases are utilized for establishing and detecting email malware. Although three phases are described herein, it is appreciated that there may be more of fewer phases that are utilized within the scope of the present invention. The utilization of three phases is merely for purposes of brevity and clarity to describe one of a plurality of possible embodiments.

With reference now to step 502 of FIG. 5, and to FIG. 3, one embodiment provides a detector decoy email account 333 to serve as generic bait for malicious software for a domain within the trusted network 300. In one embodiment, as described herein, the email malware detector 400 of FIG. 4 utilizes the detector decoy email account provider 410 to establish a detector decoy email account 333 (or decoy email account) within the trusted email domain (e.g., email accounts 315-318 of FIG. 3).

With reference now to step 504 of FIG. 5, and to FIG. 3, one embodiment provides at least one email account for the domain within the trusted network as a detector probe account. In one embodiment, every email account (e.g., email accounts 315-318) within the domain (e.g., trusted network 300) is configured with the detector decoy email account 333 in the contacts list with a permission such that the detector decoy email account 333 address cannot be deleted. In another embodiment, emails having the detector decoy email account 333 address thereon are provided to the inbox and sent items of every email account (e.g., email accounts 315-318) within the domain with the detector decoy email account 333 address in the 'from' and 'to' locations respectively. The permissions for both these emails are sent in such a way that they cannot be deleted from the email accounts (e.g., accounts 315-318) within the trusted network. The setup for the email accounts (e.g., accounts 315-318 of FIG. 3) may be performed during setup for the new account, or when the email malware detector 400 is initially introduced into the domain.

Referring now to step 506 of FIG. 5 and to FIG. 3, one embodiment generates a policy based infection response when the decoy email account receives an email from the detector probe account within the trusted network. For example, when any email account (e.g., email accounts 315-318) that was configured with the detector decoy email account 333 address becomes infected with malware, and that malware then tries to use the email mechanism to propagate itself to email addresses available on the compromised account, the malware will send an infected email to the detector decoy email account 333. Since, in one embodiment, the detector decoy email account 333 is intentionally setup to detect propagation behavior, the detector decoy email account 333 will automatically validate that the email received to the detector decoy email account 333 originated from an infected trusted account.

Moreover, when the email is verified as originating from a trusted account, the email cannot be considered random or harmless "spam", thereby providing a higher confidence on the detection being related to malware propagation and not spam. In another embodiment, the email domain is hardened. That is, the email domain is implemented in such a way that email account spoofing is not easily possible within the domain. This hardening will provide additional prevention capabilities for ensuring the infected email account is correctly recognized.

Once the infected email account is detected, an automatic policy based reaction is configured to prevent further propagation of the malware. Although in one embodiment, the email malware detector 400 may not completely or fully prevent any other system from getting infected every time, the email malware detector 400 will be able to significantly throttle down the propagation of the malware.

After the detector decoy email account 333 declares an infected email account, pluralities of actions are possible. The following are exemplary methods of a few of the myriad of possible responses which may be invoked upon infection recognition. Furthermore, the following responses may be performed alone or in combination with other responses to affectively deal with the infected account. In some cases, the size and length of the response may be based on the initial size of the infection, the speed of infection, the nature of the malware, and the like. It is appreciated that the following examples are merely a few of the many possible responses and are described herein for purposes of brevity and clarity.

In one embodiment, upon the recognition of an infection, the system hosting the infected email account will be disconnected from the network. This action will ensure that the malware doesn't continue to propagate itself via non-email methods. In one embodiment, the system disconnect is accomplished by reconfiguring routing access control lists (ACLs) or by expiring the dynamic host configuration protocol (DHCP) Internet protocol (IP) addresses allocated, or the like. In addition, by isolating the system hosting the infected email account, if the malware had setup any backdoors to the system, the backdoors would become useless owing to the complete isolation of the system.

In another embodiment, the infected email account is blocked from any further activity on the email server. This action will ensure that until the email account is disinfected, the malware cannot further propagate itself via email. In another embodiment, all emails sent from the infected email account are recalled prior to the disabling of the infected email account. By recalling the emails sent from the infected email account, any other email accounts to which the infected email account sent the malware will avoid infection. In one embodiment, the length of time (prior to the infection recognition 'zero time') for recalling sent emails is based on the time stamp on the infected email. For example, if the infected email was received at 2200Z, the recall may be performed for the infected email account starting at 2000Z. In another embodiment, the recall is a 12-hour (or 6-hour, or 24 hour, or any desired time frame) recall.

In one embodiment, a tag is provided to all email accounts to which emails from the infected account were sent, within the previous so many minutes from when the infected account is disabled. In general, the tag is used to mark email accounts as 'potential' infected accounts. In one embodiment, the tag time is similar in length to the recall time. In another embodiment, the tag time is shorter or longer than the recall time.

In one embodiment, after an infection is declared, an antivirus scan is run on the systems hosting the infected email account and 'potential' infected email accounts. Moreover, in another embodiment, an out of band message (e.g., voice mail, page, or the like) is sent to the infected email account and system owner (and in one embodiment, any possibly infected or tagged accounts). In one embodiment, the out of band message will provide information including if any of the above actions were performed. In another embodiment, an audit is performed on all the emails sent from the time the infection was detected. In one embodiment, the audit may be manually analyzed at a later time to help establish the infection origin.

Figure 6:
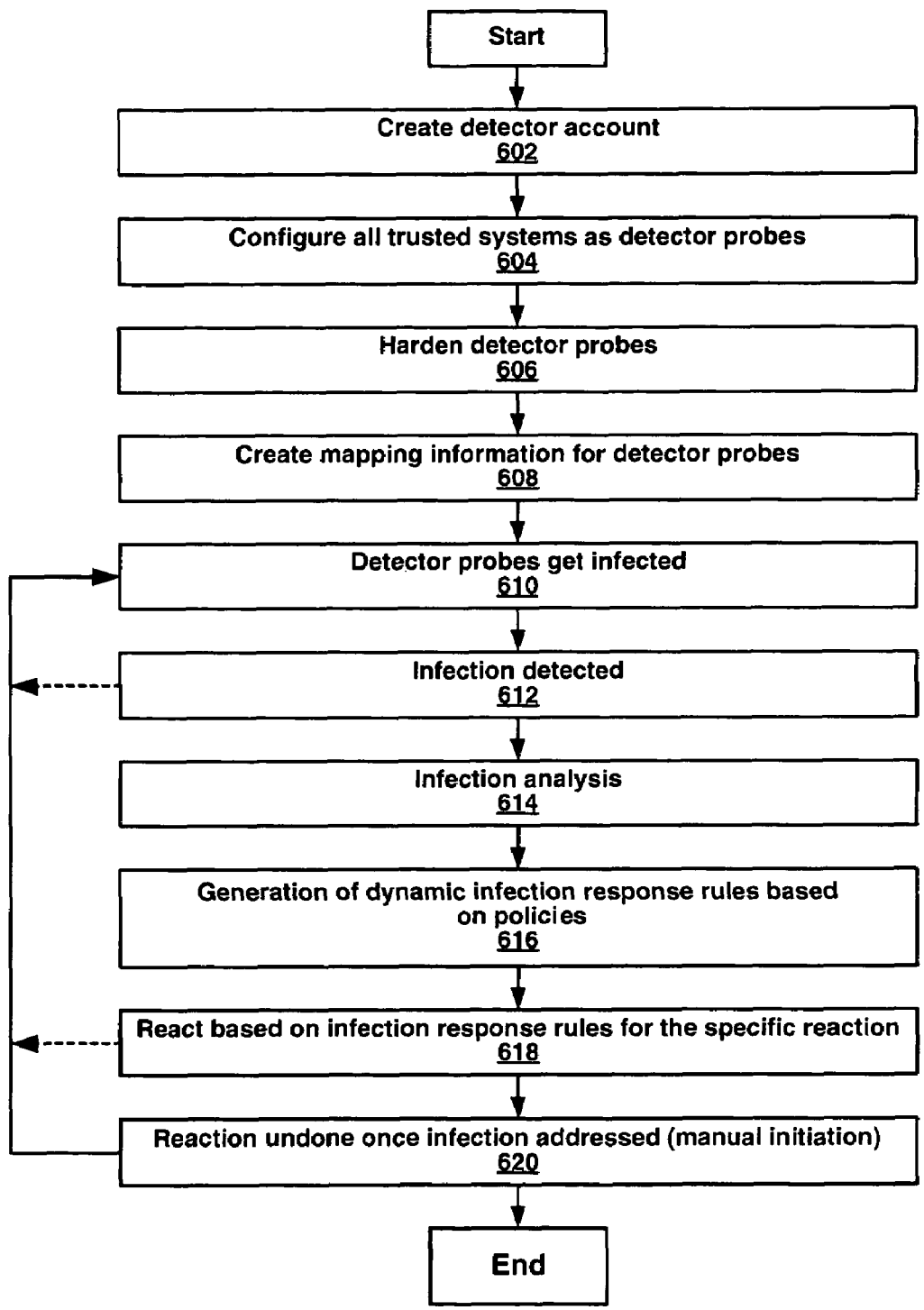
FIG. 6 is a flowchart of an exemplary method for detecting and preventing propagation of email based malware in a trusted computing environment in accordance with one embodiment of the present invention.

With reference now to FIG. 6, a flowchart of one exemplary method for detecting and preventing propagation of email based malware is shown in accordance with one embodiment of the present invention. As described herein, the malware may be any type of malicious software such as, but not limited to, a virus, a worm, or the like.

With reference now to step 602 of FIG. 6 and to FIG. 3, one embodiment creates a detector account. In one embodiment, the detector account is a decoy email account in the email domains where the email malware detector 400 of FIG. 4 is to be applied.

Referring now to step 604 of FIG. 6 and to FIG. 3, one embodiment configures all trusted systems as a detector probes. That is, all trusted email accounts within the email domain, e.g. the email accounts A315-D318 are configured to include the detector decoy email account 333. In one embodiment, the detector decoy email account 333 is configured in the inbox, sent folder and also in the contacts list of the email accounts A315-D318.

With reference now to step 606 of FIG. 6 and to FIG. 3, one embodiment hardens the detector probes. That is, the detector probes are configured such that the detector decoy email account 333 provided in the trusted email accounts A315-D318 cannot be deleted. In one embodiment, any attempt to delete the detector decoy email account 333 would generate an auto-response email to that account indicating the importance of the email or contact. In another embodiment, the entire email domain is configured such that spoofing within the email domain is not possible.

Referring now to step 608 of FIG. 6 and to FIG. 3, one embodiment creates mapping information for the detector probes. In general, the mapping information is created using automated inventory techniques to create a database containing information about which physical trusted systems host a specific trusted email account.

With reference now to step 610 of FIG. 6 and to FIG. 3, in one embodiment the detector probes get infected. For example, owing to any reason (email virus, network worm etc) one of the systems (e.g. trusted email accounts A315-D318) hosting the detector decoy email account 333 gets infected with a worm that tries to propagate itself via email (among other methods). In one embodiment, the worm will try to harvest the email accounts A315-D318 for its spread, and will try to send itself to those harvested email accounts (among which would be the detector decoy email account 333).

Referring now to step 612 of FIG. 6 and to FIG. 3, in one embodiment the infection is detected. In general, the receipt of the email to the detector decoy email account 333 indicates detection of a system being infected with a worm. In one embodiment, since the emails originate from trusted email accounts (e.g. trusted email accounts A315-D318), the probability of the trigger being random spam is significantly reduced. In one embodiment, when the email is found to originate from a trusted physical system (e.g., trusted email accounts A315-D318) the email account hosted by that physical system is considered to be infected. In another embodiment, e.g., the case wherein the email originates from a non-trusted email account (i.e. outside the domain) and the anti-spoofing configuration is enabled, the email just discarded. In yet another embodiment, e.g., the case wherein the email originates from a non-trusted email account (i.e. outside the domain) and anti-spoofing configuration is not enabled, the email header is analyzed in step 614.

With reference now to step 614 of FIG. 6 and to FIG. 3, in one embodiment the infection is analyzed. That is, the header from the email sent to the detector decoy email account 333 is analyzed for source system information. In another embodiment, the mapping information is retrieved for the specific infected email account.

Referring now to step 616 of FIG. 6 and to FIG. 3, one embodiment generates a set of dynamic infection response rules based policies. In one embodiment, the appropriate response rules are created dynamically for the infection. For example, the policies can be time based. For example during non-production hours the response can be less stringent or if a new worm is just set loose, the reaction can be more stringent. The following response rules may be applied alone, or in combination to provide containment for the malware being introduced by the email.

In one embodiment, the infected system is isolated. That is, the source system and/or all other systems that hosted the infected email account such that worm is localized and there is no way it can propagate further without manual initiation. The isolation may be performed via a plurality of methods. In a switched environment the infected systems can be put in an isolated VLAN. In a DHCP environment, the IP address is disabled. In a non-switched non-DHCP environment the routers and firewalls are configured to block specific IP addresses. This method is especially relevant when a remote user system having access to the trusted infrastructure is infected.

In another embodiment, only the infected email account is disabled. Furthermore, in one embodiment, a recall of all the emails sent from the infected email account within the last x minutes (from the time the account is disabled) is performed. In one embodiment, the recall time x is based on the time stamp on the infected email. For example, if the infected email was received at 2200Z, the recall may be performed for the infected email account starting at 2000Z. In another embodiment, the recall is a 12-hour (or 6-hour, or 24 hour, or any desired time frame) recall.

In one embodiment, a tag is provided to all email accounts to which emails from the infected account were sent within the last y minutes (from the time the infected account is disabled). In general, the tag is used to mark email accounts as 'potential' infected accounts. In one embodiment, the time y is similar in length to the time x. In another embodiment, time y is shorter or longer than time x.

With reference still to step 616 of FIG. 6 and to FIG. 3, one embodiment initiates the running of anti-virus scans on the systems hosting the infected email account and 'potential' infected email accounts. Moreover, in another embodiment, an out of band message (e.g., voice mail, page, or the like) is sent to the infected email account and system owner. In one embodiment, the out of band message will provide information including if any of the above actions were performed. In another embodiment, an audit is performed on all the emails sent from the time the infection was detected. In one embodiment, the audit may be manually analyzed at a later time to help establish the infection origin.

With reference now to step 618 of FIG. 6 and to FIG. 3, in one embodiment the email malware detector 400 automatically reacts based on infection response rules for the specific reaction as generated in step 616. For example, by using standard APIs or data, the email malware detector 400 initiates reactions as per the reaction rules to block the worm from further propagation. In one embodiment, once the reaction occurs, the email malware detector 400 will tag the infected email account as 'responded', such that any further infected emails from the infected account are discarded without additional redundant steps being performed.

Referring now to step 620 of FIG. 6 and to FIG. 3, in one embodiment the reaction is undone once the infection is addressed and resolved. For example, once the infected email account and the systems that hosted that email account are cleaned of any malware, a manual initiation based event triggers the undoing of any reactions that continue to affect the system/account. In other words, the dynamic reaction rules that were used for the infection response are re-analyzed for undoing any of the reactions (e.g., IP address of the system is re-enabled, email account is re-enabled, quarantine is lifted, and the like). In one embodiment, once the reactions are undone, the 'responded' tagging (e.g., as performed in step 618) for the email account is removed so that it can be re-enabled for being used as a detector probe. In another embodiment, the reaction is undone automatically once the infected email account and the systems that hosted that email account are cleaned of any malware.

Thus, embodiments of the present invention provide methods and systems for detecting and responding to email based propagation of malicious software (malware) in a trusted network. Furthermore, embodiments are used to detect "zero-day" types of worms (e.g., malware for which anti-virus signatures have not yet been put together), or other worms, virus and the like, which occur within a trusted infrastructure and in addition ensure that the infected trusted system is stopped from infecting other trusted systems within the trusted infrastructure.

In addition, embodiments are not limited based on network connectivity to the infected system since it is applied on a per email domain basis. The email malware detector can be deployed to any type of complex network (such as UCE) and is transparent to the network topology (supports both internal and external trusted systems). Moreover, embodiments do not just react at the perimeter, the email malware detector is active within the trusted network infrastructure. Therefore, it is not limited to external threat agents but is also affective against insider threat agents. Additionally, response embodiments are flexible based on static policies, and dynamic issues such as time and environment.

Even though in one embodiment, the detection is limited to email propagation, the response is not limited to preventing email malware propagation, but all types of methods used by the malware to propagate, since the response will in one embodiment include isolating the system from the trusted network itself. Moreover, embodiments are entirely automatic and require only a one-time setup. Embodiments do not need continuous customization or manual intervention.

Embodiments of the present invention are thus described. While the present invention has been described in particular embodiments, it should be appreciated that the present invention should not be construed as limited by such embodiments, but rather construed according to the following claims.

I claim:

1. A method for detecting and responding to email based propagation of malicious software (malware) in a trusted network comprising:

providing a detector decoy email account to serve as generic bait for malicious software for a domain within the trusted network;

providing at least one email account for the domain within the trusted network as a detector probe account;

generating a policy based infection response rule when the detector decoy email account receives an email from the detector probe account within the trusted network, wherein said policy based infection response rule comprises automatically initiating said associated infection response, wherein said automatically initiated infection response utilizes an auditing action selected from the group of auditing actions including: auditing each account receiving an email from the infected account prior to the infection response, tagging each said account receiving an email from the infected account as a potential threat, and auditing all emails that were sent from the infected account within a day from the time the malware was detected, for later root cause analysis.

2. The method of claim 1 further comprising:

providing every email account for the domain within the trusted network as a detector probe account.

3. The method of claim 1 further comprising:

hardening said detector probe account to prevent accidental deletion or modification.

4. The method of claim 3 wherein said hardening comprises:

providing a warning to a device within the trusted network when the detector decoy email account configuration is sought to be deleted or modified, and the action is denied.

5. The method of claim 1 wherein said detector probe account configuration comprises:

providing an address for said detector decoy email account to the address book, contact list, inbox, and sent folders of said detector probe account within the trusted network.

6. The method of claim 1 further comprising:

providing a different said detector decoy email account for every domain within the trusted network.

7. The method of claim 1 wherein said automatically initiated infection response utilizes a blocking action selected from the group of blocking actions including: isolating a system hosting the infected account from the trusted network, blocking the infected account from further email activity, and recalling all emails sent from the infected account prior to the infection response.

8. The method of claim 1 wherein said automatically initiated infection response provides a notification action comprising:

sending an out-of-band action message to said infected account and any other potential threat account where reaction has been initiated.

9. The method of claim 1 further comprising:

undoing the blocking action after the system hosting the infected account is disinfected.

10. A computer-implemented email based propagation of malicious software (malware) detector for a trusted network comprising:

a detector email account provider for providing a detector email account for a domain within the trusted network;

a detector probe account provider for setting each email account for a domain within the trusted network as a detector probe accounts by configuring the detector decoy email account to serve as generic bait for malicious software, said detector probe account hardened to prevent accidental deletion or modification;

a policy based infection response rules generator for generating a policy based infection response when the decoy email account receives an email from the detector probe account within the trusted network, wherein said policy based infection response rules generator automatically initiates associated infection response, wherein said automatically initiated infection response is selected from the group of responses including: an account auditor for auditing each account receiving an email from the infected account prior to the infection response, an account tagger for tagging each said account receiving an email from the infected account as a potential threat, and an account auditor for auditing all emails that were sent from the infected account within a day from the time the malware was detected, for later root cause analysis.

11. The computer-implemented email based malware detector of claim 10 wherein said detector probe email account provider configures the detector decoy email account address to the address book, contact list, inbox, and sent folders of every email account within the trusted network.

12. The computer-implemented email based malware detector of claim 10 wherein said detector decoy email account provider provides a different said detector decoy email account for every domain within the trusted network.

13. The computer-implemented email based malware detector of claim 10 wherein said hardened account provides a warning to a device within the trusted network when an attempt to delete or modify the detector decoy email account configuration occurs.

14. The computer-implemented email based malware detector of claim 10 wherein said automatically initiated infection response is selected from the group of responses including: a system isolator for isolating a system hosting the infected account from the trusted network, an account blocker for blocking the infected account from further activity, and an email account recaller for recalling all emails sent from the infected account prior to the infection response.

15. The computer-implemented email based malware detector of claim 10 wherein said automatically initiated infection response is followed with notification action comprising:
a message generator for sending an out-of-band action message to said infected account and any other potential threat account where reaction has been initiated.

16. The computer-implemented email based malware detector of claim 10 wherein after any blocking action is taken and a system hosting the infected account is disinfected, the blocking action is undone.

17. A computer-usable medium having computer-readable program code embodied therein for causing a method for detecting and responding to email based propagation of malicious software (malware) in a trusted network comprising:
providing a detector decoy email account to serve as generic bait for malicious software for a domain within the trusted network;
providing at least one email account for the domain within the trusted network as a detector probe account;
generating a policy based infection response rule when the detector decoy email account receives an email from the detector probe account within the trusted network, wherein said policy based infection response rule comprises automatically initiating said associated infection response, wherein said automatically initiated infection response utilizes an auditing action selected from the group of auditing actions including: auditing each account receiving an email from the infected account prior to the infection response, tagging each said account receiving an email from the infected account as a potential threat, and auditing all emails that were sent from the infected account within a day from the time the malware was detected, for later root cause analysis.

18. The computer-usable medium of claim 17 further comprising:
providing every email account for the domain within the trusted network as a detector probe account.

19. The computer-usable medium of claim 17 further comprising:
hardening said detector probe account to prevent accidental deletion or modification.

20. The computer-usable medium of claim 19 wherein said hardening comprises:
providing a warning to a device within the trusted network when the detector decoy email account configuration is sought to be deleted or modified, and the action is denied.

21. The computer-usable medium of claim 17 wherein said detector probe account configuration comprises:
providing an address for said detector decoy email account to the address book, contact list, inbox, and sent folders of said detector probe account within the trusted network.

22. The computer-usable medium of claim 17 further comprising:
providing a different said detector decoy email account for every domain within the trusted network.

23. The computer-usable medium of claim 17 wherein said automatically initiated infection response utilizes a blocking action selected from the group of blocking actions including: isolating a system hosting the infected account from the trusted network, blocking the infected account from further email activity, and recalling all emails sent from the infected account prior to the infection response.

24. The computer-usable medium of claim 17 wherein said automatically initiated infection response provides a notification action comprising:
sending an out-of-band action message to said infected account and any other potential threat account where reaction has been initiated.

25. The computer-usable medium of claim 17 further comprising:
undoing the blocking action after the system hosting the infected account is disinfected.

\* \* \* \* \*

UNITED STATES PATENT AND TRADEMARK OFFICE
CERTIFICATE OF CORRECTION

PATENT NO. : 7,636,944 B2
APPLICATION NO. : 11/262436
DATED : December 22, 2009
INVENTOR(S) : Amit Raikar It is certified that error appears in the above-identified patent and that said Letters Patent is hereby corrected as shown below:

In the Drawings:

On Sheet 1 of 6, in Figure 1, add element number "100", above Figure.

On Sheet 2 of 6, in Figure 2, add element number "200", above Figure.

On Sheet 3 of 6, in Figure 3, add element number "300", above Figure.

On Sheet 4 of 6, in Figure 4, add element number "400", below "Email Malware Detector".

On Sheet 5 of 6, in Figure 5, add element number "500", above Figure.

On Sheet 6 of 6, in Figure 6, add element number "600", above Figure.

Signed and Sealed this

Eleventh Day of May, 2010

David J. Kappos
*Director of the United States Patent and Trademark Office*